United States Patent Office 3,052,668
Patented Sept. 4, 1962

3,052,668
ISOALLOXAZINE COMPOUND
John P. Lambooy, Rochester, N.Y., assignor to Noned Corporation, Rochester, N.Y., a corporation of New York
No Drawing. Filed Oct. 20, 1955, Ser. No. 541,850
1 Claim. (Cl. 260—211.3)

The present invention relates to 6,7-diethyl-9-(D-1'-ribityl)-isoalloxazine and to a process for the production thereof.

This application is a continuation-in-part of copending application Serial No. 253,000, filed October 24, 1951, now abandoned.

The novel compound of the present invention is represented by the structural formula:

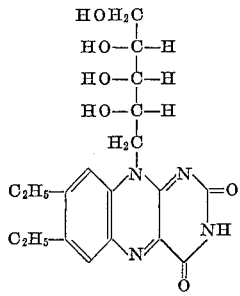

6,7-diethyl-9-(D-1'-ribityl)-isoalloxazine is a potent riboflavin inhibitor or antagonist and is useful for producing riboflavin deficient laboratory experimental animals such as rats and mice. As compared with the prior art procedure of maintaining experimental laboratory animals on a riboflavin deficient diet to induce riboflavin deficiency, it has been found that by placing these animals on a diet containing 6,7-diethyl-9-(D-1'-ribityl)-isoalloxazine, riboflavin deficiency can be more rapidly induced thereby significantly shortening the preparatory time to secure animals in this condition. These riboflavin deficient animals are used experimentally for nutrition studies.

It is an object of the present invention to provide a novel compound which has utility as a riboflavin antagonist. A further object of the invention is the provision of a process for the preparation of 6,7-diethyl-9-(D-1'-ribityl)-isoalloxazine. Additional objects of the invention will be apparent to one skilled in the art to which this invention applies.

According to the method of the present invention, 2-(D-1'-ribitylamino)-4,5-diethylaniline is condensed with alloxan to give the 6,7-diethyl-9-(D-1'-ribityl)-isoalloxazine as represented by the reaction:

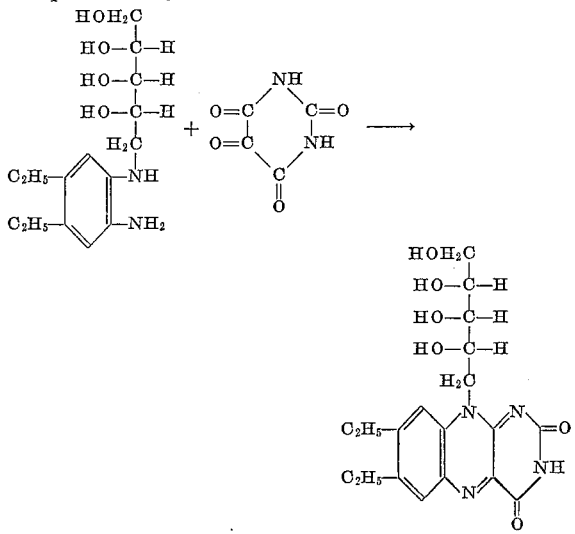

The 2-(D-1'-ribitylamino) - 4,5 - diethylaniline is prepared from 3,4-diethylaniline by the following sequence of reactions. 3,4-diethylaniline [Lambooy, J. Am. Chem. Soc. 71, 3756 (1949) or prepared by the method of Wisansky and Ansbacher, Organic Synthesis, 28, 22 (1948)] is acetylated with acetic anhydride to give 3,4-diethylacetanilide, which is then nitrated with nitric acid in the two position to give 4,5-diethyl-2-nitroacetanilide. Saponification of the latter compound with sodium hydroxide followed by reaction with D-ribose gives 4,5-diethyl-2-nitroaniline-N-D-riboside. Catalytic reduction of this compound gives the starting 2-(D-1'-ribitylamino)-4,5-diethylaniline.

In carrying out the process of the present invention, 2-(D-1'-ribitylamino)-4,5-diethylaniline is condensed with alloxan in a suitable solvent such as, for example, acetic acid, alcohol, dioxan, water, or the like, at a temperature between about twenty and about 110 degrees centigrade. It is preferred to heat the reaction mixture at forty to fifty degrees for thirty minutes and then allow the mixture to stand at room temperature for 48 hours before filtration. However, other temperatures and reaction times may be employed and the conditions to be employed will be apparent to one skilled in the art.

The compound of the present invention has been found to act as a riboflavin antagonist. This result is entirely unexpected in view of the riboflavin activity in rats or mice of other riboflavin-like compounds such as, for example, 6-methyl-9-(D-1'-ribityl)-isoalloxazine, 7-methyl-9-(D-1'-ribityl)-isoalloxazine and 6-ethyl-7-methyl-9-(D-1'-ribityl)-isoalloxazine.

The following examples are given to illustrate the method and compounds of the present invention, but are not to be construed as limiting.

*Preparation 1.—3,4-diethylacetanilide*: 3,4-diethyl aniline was refluxed for one minute with an equal weight of 99–100 percent acetic anhydride to produce 3,4-diethylacetanilide, having a melting point of 118 degrees centigrade, in a yield of 95–98 percent.

*Preparation 2.—4,5-diethyl-2-nitroacetanilide*: A mixture of 100 milliliters of concentrated nitric acid and 38 milliliters of concentrated sulfuric acid was cooled to minus ten degrees centrigrade. 3,4-diethylacetanilide (21.7 grams, 0.112 mole) was ground to a fine powder and divided roughly into ten portions. Following the addition of each portion of the acetanilide, the reaction mixture became orange-brown. A subsequent addition was delayed until the color had returned to a bright yellow-orange. The addition required about one and one-half hours and at no time did the temperature exceed minus five degrees centigrade. The mixture was finally stirred an additional thirty minutes in the cooling bath. The mixture was then poured on ice whereupon it solidified. The material was dissolved in ether and the solution was washed three times with water, once with ten percent sodium bicarbonate solution and again three times with water. After drying the ether solution and removing the solvent, the product was recrystallized from ethyl alcohol to give 15.6 grams (58 percent) of yellow needles with a melting point of 76–77 degrees centigrade.

*Analysis.*—Calculated for $C_{12}H_{16}N_2O_3$: N, 11.86. Found: N, 11.9; 12.1.

*Preparation 3.—4,5-diethyl-2-nitroaniline*: Ten grams of 4,5-diethyl-2-nitroacetanilide in 200 milliliters of fifty percent aqueous alcohol was heated to eighty degrees centigrade on the steam bath and twenty grams of sodium hydroxide in forty milliliters of water was then added. The mixture was maintained at eighty degrees centigrade for thirty minutes and was then placed in the refrigerator. The resulting crystalline solid was filtered and dried to yield 7.7–8.1 grams (94–98 percent) of 4,5-diethyl-2- nitroaniline, having a melting point of 65–66 degrees centigrade.

*Preparation 4.—4,5-diethyl - 2-nitroaniline-N-D-ribopyranoside*: D-ribose (1.5 grams) was dissolved in 25 milliliters of absolute alcohol. One drop of three normal sulfuric acid was then added. Two grams of 4,5-diethyl-2-nitroaniline was added with stirring. The reaction was maintained at room temperature for two hours and then set in the refrigerator at five degrees centigrade overnight. The product which crystallized out was filtered off, washed with cold alcohol, and finally with dry ether. The yield of fine yellow needles, melting with decomposition at 171–177 degrees centigrade, was 2.2–2.3 grams (67–70 percent).

*Anal.*—Calcd. for $C_{15}H_{22}O_6N_2$: C, 55.20; H, 6.80; N, 8.59. Found: C, 55.24; H, 7.14; N, 8.60.

*Preparation 5.—2-(D-1'-ribitylamino) -4,5- diethylaniline*: Two grams of 4,5-diethyl-2-nitroaniline-N-D-ribopyranoside was dissolved in approximately 300 milliliters of 72 percent alcohol and 57 milliliters of a solution containing 0.83 gram of primary sodium borate ($NaH_2BO_3$) was added. After the addition of five grams of palladium on calcium carbonate catalyst containing trace amounts of zinc and cupric hydroxides, the mixture was reduced at thirty atmospheres of hydrogen for six hours at seventy to eighty degrees centigrade. To the mixture was added 200 milligrams of ascorbic acid and the solution was concentrated to dryness under reduced pressure at a bath temperature of 35 degrees centigrade. The residue was dissolved in absolute alcohol and concentrated to dryness to remove any water from the product. This was repeated several times. The dried residue was used directly in the preparation of 6,7-diethyl-9-(D-1'-ribityl)-isoalloxazine.

The 2-(D-1'-ribitylamino)-4,5-diethylaniline can also be prepared by reduction of 2-(D-1'-ribitylamino)-4,5-diethylnitrobenzene, which is prepared by the condensation of 1,2-dinitro-4,5-diethylbenzene and d-ribamine.

*Example 1.—6,7 - diethyl - 9 - (D-1'-ribityl)-isoalloxazine*: The 2-(D-1'-ribitylamino)-4,5-diethylaniline from Preparation 5 above was dissolved in twenty milliliters of glacial acetic acid and to the solution was added a suspension of 1.4 grams of boric acid and 1.4 grams of alloxan in twenty milliliters of glacial acetic acid. The mixture was shaken at forty to fifty degrees centrigrade for thirty minutes and was then allowed to stand at room temperature for 48 hours. The mixture was concentrated to dryness under reduced pressure and the residue was suspended in 250 milliliters of five percent aqueous acetic acid, heated to boiling and filtered. Upon cooling, 0.82 gram (33 percent) of fine orange needles were deposited. The 6,7-diethyl-9-(D-1'-ribityl)-isoalloxazine darkens at 245 degrees centigrade and melts at 255–256 degrees centigrade.

*Anal.*—Calcd. for $C_{19}H_{14}N_4O_6$: C, 56.34; H, 5.98; N, 13.85. Found: C, 55.9; H, 5.9; N, 14.0.

It is to be understood that the invention is not to be limited to the exact details of operation or exact compounds shown and described, as obvious modifications and equivalents will be apparent to one skilled in the art, and the invention is therefore to be limited only by the scope of the appended claim.

I claim:

6,7-diethyl - 9 - (D-1'-ribityl)-isoalloxazine, having the structural formula:

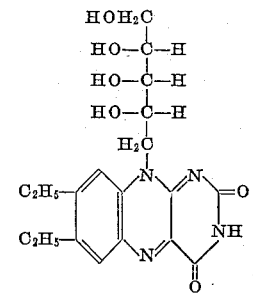

References Cited in the file of this patent

UNITED STATES PATENTS

| | | |
|---|---|---|
| 2,155,555 | Karrer | Apr. 25, 1939 |
| 2,238,874 | Kuhn et al. | Apr. 15, 1941 |
| 2,350,376 | Tishler et al. | June 6, 1944 |
| 2,456,395 | Flexser et al. | Dec. 14, 1948 |
| 2,634,265 | Miller | Apr. 7, 1953 |

FOREIGN PATENTS

| | | |
|---|---|---|
| 628,410 | Great Britain | Aug. 29, 1949 |